United States Patent [19]

Rachal

[11] Patent Number: 4,915,896
[45] Date of Patent: Apr. 10, 1990

[54] VACUUM BAGGING PROCESS FOR FIBER REINFORCED THERMOPLASTICS

[75] Inventor: Duane M. Rachal, Pearland, Tex., James R. Krove, Bartlesville, Ok.

[73] Assignee: Phillips Petroleum Company, Bartlesville, Okla.

[21] Appl. No.: 91,815

[22] Filed: Sep. 1, 1987

[51] Int. Cl.⁴ .................. B29C 43/20; B29C 43/56
[52] U.S. Cl. .................................. 264/511; 264/102; 264/257; 264/258; 264/348; 264/571
[58] Field of Search ............. 264/510, 511, 512, 102, 264/258, 101, 571, 257, 348; 432/8, 11

[56] References Cited

U.S. PATENT DOCUMENTS

| | | | |
|---|---|---|---|
| 4,062,917 | 12/1977 | Hill | 204/102 |
| 4,132,755 | 1/1979 | Johnson | 264/102 |
| 4,217,157 | 8/1980 | Stoltze | 264/102 |
| 4,270,964 | 6/1981 | Flaskett | 264/510 |
| 4,311,661 | 1/1982 | Palmer | 264/510 |
| 4,562,033 | 12/1985 | Johnson | 264/510 |
| 4,588,538 | 5/1986 | Chung | 264/136 |
| 4,608,220 | 8/1986 | Caldwell | 264/510 |
| 4,652,319 | 3/1987 | Hammond | 264/101 |
| 4,681,718 | 7/1987 | Oldham | 264/102 |
| 4,683,099 | 7/1987 | Buxton | 264/511 |
| 4,765,942 | 8/1988 | Christensen | 264/510 |

OTHER PUBLICATIONS

Briskheat Vacuum Table Brochure.
Air Tech Vacuum Bagging Supply Brochure.
Moen Brochure on Gas Jet Heating.
Durafilm Brochure on Teflon Fabric.
Rockwell Brochure on Gas Jet Heating.
Heat Transfer Technolgies Brochure on "Moen".

Primary Examiner—Richard L. Chiesa
Assistant Examiner—Jeremiah F. Durkin, II
Attorney, Agent, or Firm—Richmond, Phillips, Hitchcock & Umphlett

[57] ABSTRACT

A method of consolidating a fiber reinforced thermoplastic poly(arylene sulfide) composite by vacuum bagging. A fiber reinforced thermoplastic is placed between stainless steel sheets and then placed in a vacuum bag. A vacuum is applied to the bag and heat and pressure are applied to the layup to form a composite. A plurality of fiber reinforced sheets may be consolidated between a plurality of stainless steel sheets.

17 Claims, 2 Drawing Sheets

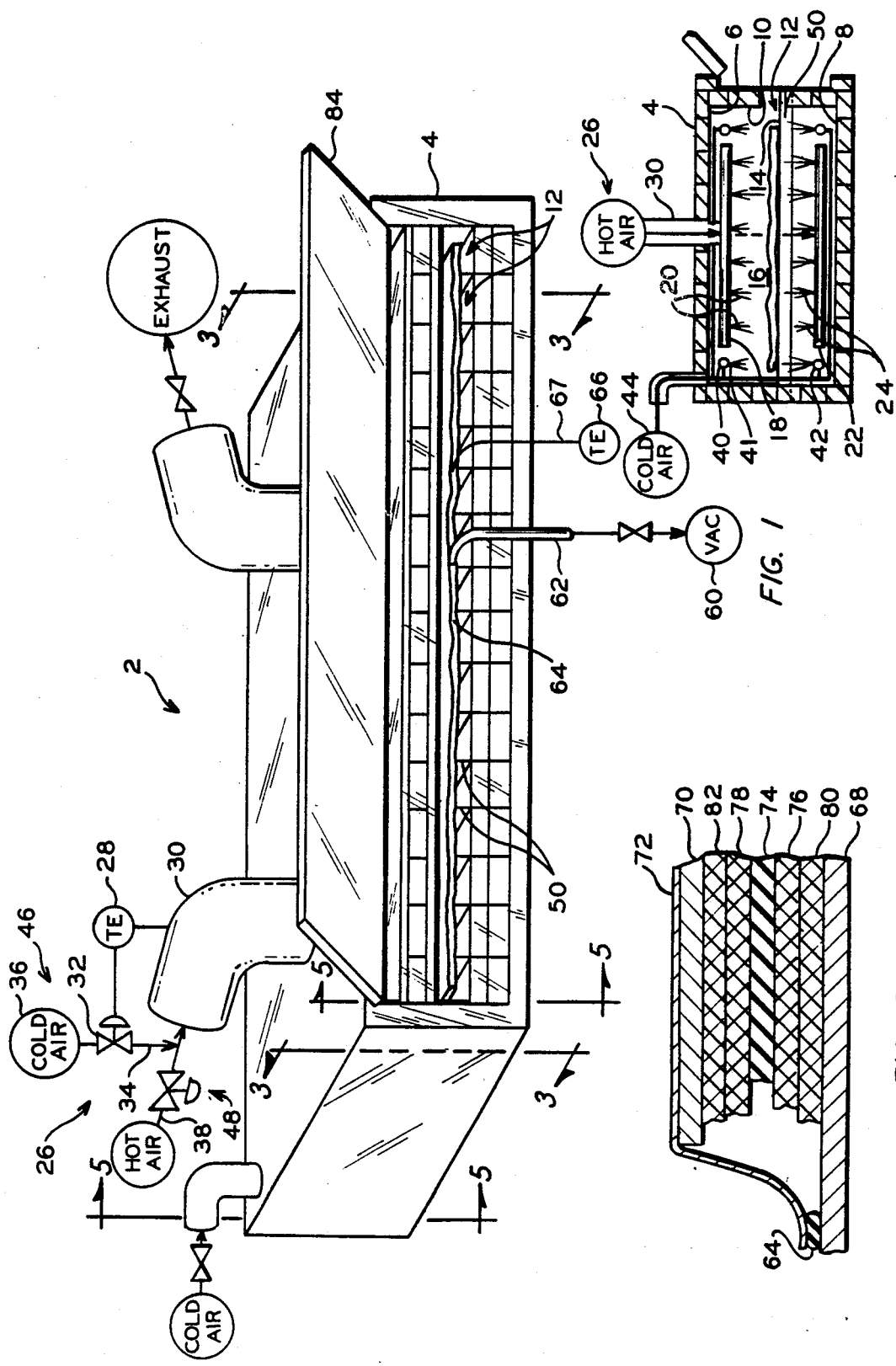

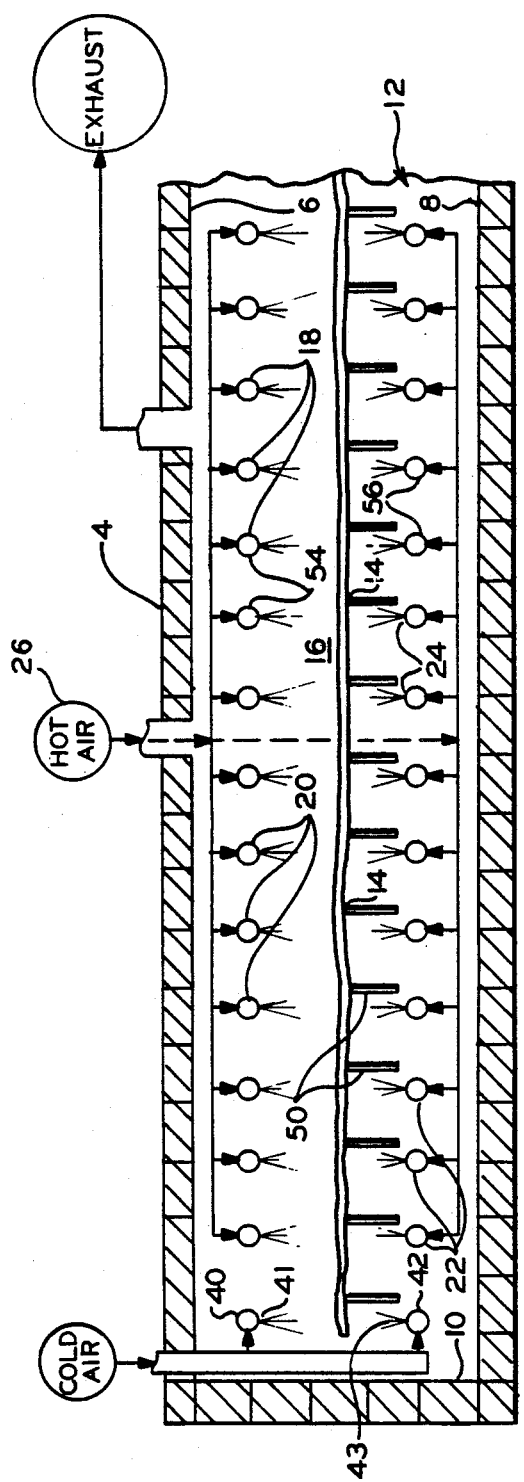
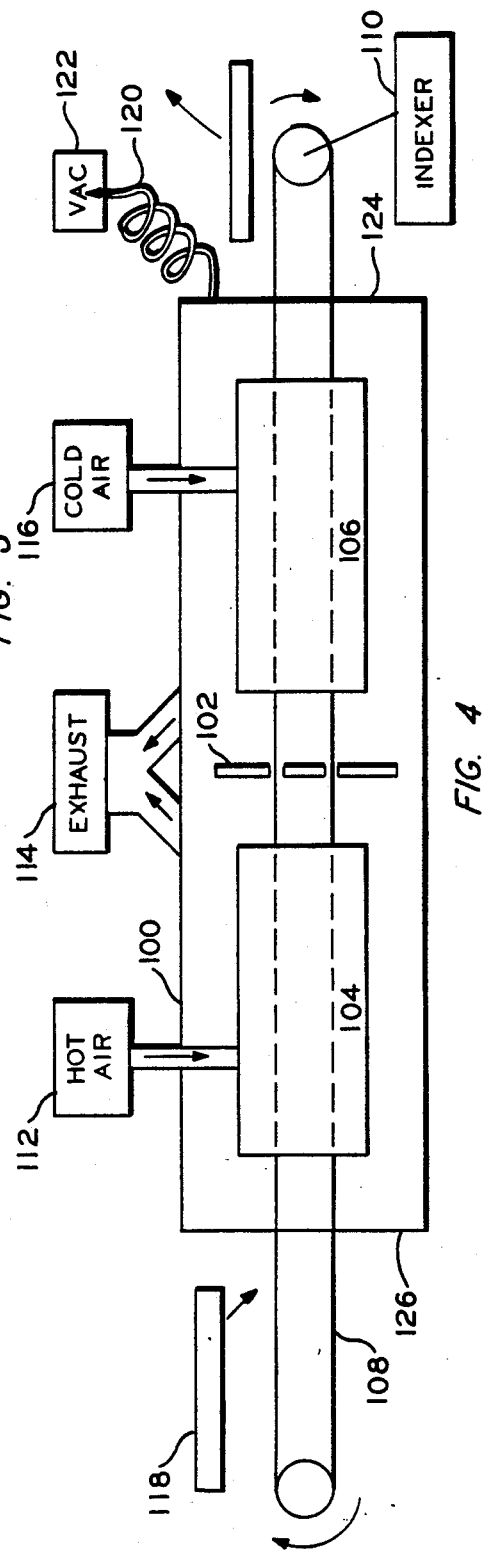
FIG. 3
FIG. 4

VACUUM BAGGING PROCESS FOR FIBER REINFORCED THERMOPLASTICS

In one aspect, the invention relates to an apparatus especially well suited for conducting a vacuum bagging process. In another aspect, the invention relates to a vacuum bagging process. In another aspect, the invention relates to a vacuum bagging layup.

Wet out of the reinforcing fibers has been a major problem holding back development of high temperature thermoplastic composites. The high viscosity of the high melting point resin in the past has necessitated the use of enormous presses where sheets of substantial size were desired. A process for forming a large composite panel containing high melting point thermoplastic resin which avoids the use of a large press during its manufacture would be very desirable.

Another problem hindering widespread commercial manufacture of panels which contain high melting point thermoplastic resins resides in the high cycle time required to produce panels from a large press. One of the promises of thermoplastics as compared to the use of thermosets is the possibility of reduced labor requirements. Shortening the cycle time required for the production of panels would help bring this promise within reach.

Another problem in prior art techniques for producing large thermoplastic panels containing high melting point resins is uneven surface appearance as well as a general lack of uniformity and flatness in the finished panel. Poor heatup of the composite is largely responsible for non-uniformities in surface finish. Warping of the panels during heat up and cool down cycles also causes disruptions in surface uniformities. An apparatus and process for providing uniform heating and cooling would be very desirable.

OBJECTS OF INVENTION

It is the object of this invention to provide an apparatus especially well suited for carrying out a vacuum bagging process.

It is another object of this invention to provide a process for forming composites containing high melting point thermoplastic resins which produces well consolidated, uniform parts.

It is still another object of this invention to provide a speedy process for producing large panels from thermoplastic composites containing high melting point resins.

SUMMARY OF THE INVENTION

In one embodiment of the invention, there is provided an oven suitable for conducting a vacuum bagging process. The oven has a ceiling and a floor and an outer perimeter extending between an outer edge of the ceiling and an outer edge of the floor. A support means having an upper surface suitable for supporting the panel is positioned in the oven. The upper surface of the support means is spaced apart from the ceiling of the oven to define a panel receiving chamber. A first manifold means is positioned between the upper surface of the support means and the ceiling of the oven. The manifold has a plurality of outlets directed downwardly in the direction of the upper surface of the support means. A second manifold means is positioned between the upper surface of the support means and the floor of the oven. This second manifold means also has a plurality of outlets directed in the direction of the upper surface of the support means. The two manifold means carry hot gas for the convection heating of a panel positioned in the oven. Convection heating provides more uniform heatup of the panel than conduction heating. By sequentially connecting the manifold to a hot gas source and then a cold gas source, a means to provide for rapid cool down of the panel once consolidation has occurred is provided.

In another embodiment of the invention, there is provided a vacuum bagging process especially well suited for forming composite panels containing high melting point thermoplastic resins. A mixture of reinforcing fibers and the desired thermoplastic resin is supported on a substrate surface. The mixture is overlayed with an air-impermeable sheet. The air-impermeable sheet is then sealed to the substrate surface to form a vacuum bagging layup which contains the mixture. The vacuum bagging layup is then moved into a convection oven and heated therein to a temperature above the melting point of the thermoplastic resin. The molten thermoplastic resin then wets out the reinforcing fibers. Suction is applied between the air-impermeable overlaying sheet and the substrate surface to urge the air-impermeable sheet toward the substrate surface and facilitate wet out of the fibers. The layup is subsequently cooled to solidify the molten thermoplastic resin and form a consolidated sheet of reinforcing fibers in a continuous matrix of the resin. The convection oven heats the mixture rapidly and with good efficiency. Uniform heating of the mixture is also provided which results in a uniform surface in the finished product. Suction provides for venting any gases released during the heatup and also facilitates wet out of the fibers with the molten resin to provide the final product with good mechanical properties.

Where all surfaces are substantially flat, a panel shaped composite is produced which can be subsequently reshaped into most any desired shape in a heated press, or laminated with other composite panels if additional strength is required. It has further been found that for poly(arylene sulfide) resins the metal components in the vacuum bagging layup should be formed from stainless steel, such as a 430 series stainless steel in order to resist warping when exposed to the high temperatures required to melt these resins. Also, it is been found to be highly advantageous to sandwich the mixture of resin and reinforcing fibers between relatively thick release cloths, preferably having a textured surface to provide better venting of the gases generated during the vacuum bagging operation. Breather cloths are preferably used outside of the release cloths to assist in venting volatiles.

In a still further embodiment of the present invention, there is provided a process for simultaneously forming multiple composite panels in a single vacuum bagging operation. A stack of composite layers of thermoplastic resin and reinforcing fibers is formed. The stack further contains metallic sheets positioned at least as the topmost layer of the stack, the bottommost layer of the stack and an additional metallic sheet separates at least two of the composite layers in the stack. The entire stack is overlayed with the flexible air-impermeable sheet which is sealed to the metallic sheet forming the bottommost layer of the stack to produce the vacuum bagging layup. This layup is then heated to a temperature above the melting point of the thermoplastic resin to produce molten thermoplastic. Suction is applied between the overlaying flexible air-impermeable sheet and the metallic sheet forming the bottommost layer of the stack to force the metallic sheet forming the topmost layer of the stack toward the metallic sheet forming the bottommost layer of the stack and achieve thorough impregnation of the reinforcing fibers with molten thermoplastic resin. By this technique, there is provided a plurality of consolidated composite sheets when the vacuum bagging layup is cooled. Productivity as measured by sheets produced/shift can thus be increased significantly.

BRIEF DESCRIPTION OF THE DRAWINGS

FIG. 1 is a pictorial representation, partially schematic, illustrating certain features of one embodiment of the present invention.

FIG. 2 is a cross-sectional view of a portion of a vacuum bagging layup can be seen in FIGS. 1, 5 and 3, for example.

FIG. 3 is a cross-sectional view, partially schematic, taken long the indicated lines of FIG. 1.

FIG. 4 is a schematic illustration of one technique by which the process of the invention can be automated.

FIG. 5 is another cross-sectional representation of the apparatus as shown in FIG. 1 when viewed along the indicated lines.

DETAILED DESCRIPTION OF THE INVENTION

According to certain aspects of one embodiment of the present invention, an apparatus illustrated generally by the numeral 2 comprises an oven 4 having an inside ceiling 6, inside floor 8 and an inside outer perimeter 10 extending between an outer edge of the ceiling 6 and an outer edge of floor 8. A support means 12 has an upper surface 14 suitable for supporting a panel. The support means 12 is positioned in the oven 4 with the upper surface 14 of the support means 12 being spaced apart from the ceiling 6 of the oven to define a panel receiving chamber 16 between the upper surface 14 of the support means 12 and the ceiling 6 of the oven 4. A first manifold means 18 is positioned between the upper surface 14 of the support means 12 and the ceiling 6 of the oven 4. The first manifold means 18 has a first multiplicity of outlets 20 directed in the direction of the upper surface 14 of the support means 12. A second manifold means 22 is positioned between the upper surface 14 of the support means 12 and the floor 8 of the oven. The second manifold means 22 has a second multiplicity of outlets 24 directed in the direction of the upper surface 14 of the support means 12.

In one embodiment of the invention, there is provided a means 26 for providing hot gases to the first manifold means 18 and the second manifold mean 22. Preferably, the means 26 comprises a heater and a blower. Preferably, the heater is a radiant heater, more preferably an electric heater, for convenience. It is desirable to control the temperature of the hot gases being conveyed to the manifold means 18 and 22. In the embodiment of the invention in FIG. 1, a temperature sensor 28 is operably associated with the first manifold means 18 and the second means 22 such as by being positioned in a supply pipe 30 forming a flow path between the means for providing hot gas and the manifolds. The temperature sensor is operatively associated with the means 26 to manipulate the temperature of the hot gases which are provided to the first manifold means and the second manifold means. For example, the temperature sensor can be operatively connected to a motor valve 32 which is positioned in a cold air line 34 connecting a cold air source 36 with a hot air supply line 38. Preferably however, the temperature sensor 28 controls current going to the electric heater.

In a preferred embodiment of the invention, essentially all of the outlets 20 in the first manifold means and essentially all of the outlets 24 in the second manifold means 22 are directed in the direction of the upper surface 14 of the support means 12. The outlets are preferably spaced in the range of 1–4 inches apart. In one embodiment of the invention, it is further preferred that the apparatus 2 be provided with a third manifold means 40 positioned generally circumferentially around the first manifold means 18 between the first manifold means 18 and the outer perimeter 10 of the oven 4. The third manifold means is preferably provided with a multiplicity of outlets 41 directed toward the upper surface 14 of the support means 12. The apparatus also preferably comprises a fourth manifold means 42 positioned generally circumferentially around the second manifold means 22 between the second manifold means 22 and the outer perimeter 10 of the oven 4. The fourth manifold means preferably has a multiplicity of outlets 43 directed toward the upper surface of the support means 12.

By connecting the third manifold means 40 and the fourth manifold means 42 to a supply of cold gas 44 such as cold air by a suitable conduit means, there is provided a means for providing cold gases to the third manifold means 41 and the fourth manifold means 42. By this arrangement, there can be provided a flow of cooling fluid to the perimeter of the oven.

To facilitate rapid cool down of the oven when desired, a means 46 is positioned for providing a flow of cold gases to the first manifold means 18 and the second means 22. There is provided also a means 48 for disconnecting the first manifold means 40 and the second manifold means 42 from the means 26 for providing hot gases. By utilizing the same distribution system for the cooling gas flow as is used for the hot gas flow, articles positioned in the oven can be rapidly cooled.

In a preferred embodiment, the support means 12 comprises a of plurality of parallel bars 50 which are mounted across the oven floor 8. Portions of the second manifold means 22 are positioned between the parallel bars. Preferably, each of the first manifold means and the second manifold means comprises a plurality of branches 54 and 56 respectively which extend in a direction generally parallel to the parallel bars 50 forming the support means.

In another embodiment of the invention, there is provided a process especially well adapted for vacuum bagging a thermoplastic composite. A mixture of reinforcing fibers and thermoplastic resin is supported on a substrate surface. The mixture is overlayed with an air-impermeable sheet and the air-impermeable sheet is sealed to the substrate surface to form a vacuum bagging layup. The layup is moved into a convection oven and heated to a temperature above melting point (or softening point if there is no melting point), of the thermoplastic resin. Suction is applied between the air-impermeable sheet and the substrate surface to urge the sheet toward the substrate surface, vent any generated gases, and by compression, cause good wet out of the reinforcing fibers with the molten resin. The layup is then cooled to solidify the resin and form a consolidated sheet of reinforcing fibers in a continuous matrix of thermoplastic resin.

The beginning mixture can take of variety of forms. However, each of the resin component and the fiber component will be in a solid form. The resin can be in form of powder, pellets, fibers, or film, or sheets for example. The fibers will have a melting point higher than the melting point of the resin so that they will maintain their integrity when the resin is melted. It is recognized that some resins do not have a melting point. However, these resins are considered to have been melted as the term is used herein when they have been heated sufficiently to soften and flow under vacuum bagging pressures. Generally, long fiber reinforcement will be used in the invention. By long fibers is meant fibers having, on average, a length of greater than about one centimeter and a length: diameter ratio of greater than about 20. Continuous fibers are preferred because of the high reinforcement they provide to the final product. The fiber orientation can be random, for example, in the form of a random fiber mat; or unidirectional, such as can be provided by laying up parallel prepreg tapes of reinforcing fibers embedded in resin matrix; or biaxially oriented, for example, in the form of a fabric.

Suitable reinforcing fibers can be selected from the group consisting of carbon fiber, glass fiber, and aramid fiber, for example.

Suitable thermoplastic resins can be selected from the group consisting of polyethylene resin, polypropylene resin, polyetherether ketone resin, and poly(arylene sulfide), for example. The invention has special applicability to resins which produce volatile off-gases when heated to their melting point. This can become a major problem where the resin has a high melting point, for example, above 250° C., or a very high melting point, for example, above 325° C. Conducting the vacuum bagging operation in accordance with the invention provides for venting of volatiles from resins which contain volatile components given off when the resin is heated up to its melting point. Poly(arylene sulfide) resins, for example, have a melting point broadly in the range from about 250° C. to about 500° C. At such high temperatures sulfurous gases can be liberated as well as low boiling oligomers, if present. These gases can form voids in the composite product if not vented. Press molding operations generally used to produce composites do not provide for the venting for the volatiles as effectively as does the vacuum bagging process as practiced in accordance with the invention.

The products formed from poly(arylene sulfide) resins, in accordance with the inventive process, are believed superior to similarly sized products formed by press molding, at least for large articles. The preferred poly(arylene sulfide) resin employed in the practice of the invention comprises poly(p-phenylene sulfide) resin. A suitable material is available from Phillips 66 Company, Bartlesville, Okla., U.S.A. under the designation AG31-60, AC40-66, AC32-60 or AG20-40. The invention is believed to be applicable to other poly(arylene sulfide) resins as well, for example, poly(phenylene sulfide phenylene ketone), poly(phenylene sulfide phenylene sulfone), or poly(biphenylene sulfide).

It is desirable for the final composite to contain in the range from about 20% to about 80% resin and in the range from about 80% to about 20%, based on total weight of composite, of fibers. For high performance products, such as where poly(arylene sulfide) resins are reinforced with fibers selected from glass fibers, carbon fibers, and aramid fibers, the composite will generally contain on the order of from about 30 weight percent to about 70 weight percent reinforcing fibers, the remainder being resin.

The substrate surface upon which the mixture is supported should preferrably be a rigid material capable of withstanding the temperatures employed to melt the thermoplastic resin without warping. For low melting thermoplastic resins aluminum is highly suitable. For high melting thermoplastic resins, such as poly(arylene sulfide) resins, aluminum can warp, resulting in a misshaped laminate product. For poly(arylene sulfide) resins, a stainless steel substrate surface is preferred. A sheet of 430 series stainless steel having a thickness in the range of about 0.2 to about 2 millimeters is light weight and highly suitable.

The air-impermeable sheet with which the mixture is overlayed should be capable of withstanding the temperatures involved in melting the thermoplastic resin without degradation. Aluminum foil has been used with good results. The sealant with which there impermeable sheet is sealed to the substrate surface is preferably selected so as not to degrade at the temperatures involved in the vacuum bagging process. For high melting point resins, it may be necessary to cool the area around the sealant. Silicone-based sealant having high temperature resistance have been used with good results. One specific such sealant is GSA-8003-G, available from Airtech. Aluminum foil which has been used with good results has a thickness of about 0.127 mm.

The vacuum bagging layup as described above is moved into a convection oven. A preferred convection oven is of the type hereinabove described. In the convection oven, the layup is heated above the melting (or softening) point of the thermoplastic resin to produce a molten thermoplastic resin. Suction is applied between the air-impermeable sheet and the substrate surface to urge the air-impermeable sheet toward the substrate surface and achieve good wetout of the reinforcing fibers with the molten thermoplastic resin.

The consolidated sheet will generally have thickness in the range of about 0.25 to about 25 millimeters. Usually, the thickness of the consolidated sheet will be in the range from about 0.25 to about 5 millimeters. If desired, the sheet can be laminated and contain several layers of the desired fiber reinforcement.

With reference to FIG. 1, suction is applied between the air-impermeable sheet and the substrate surface by a vacuum means 60 such as an aspirator or preferably a vacuum pump. The vacuum means is connected to the volume between the sheet and the substrate surface by a line 62. The line 62 preferrably pierces the sealant 64 (see FIG. 2). A temperature element 66 is preferably positioned to sense the temperature in the volume between the air-impermeable sheet and the substrate surface such as by piercing the sealant bead or sealant tape 64 with an electrical lead 67 having a sensor on the end. By comparison of the temperature indicated by the temperature sensor 66 with the known melting point (or desired softening point) of the resin it is easily ascertained when the resin has become molten.

With reference to FIG. 2, it is presently preferred that the substrate surface be formed by a stainless steel sheet 68. A preferred sheet 68 is in the form of a caul plate. It is presently preferred that a second stainless steel sheet 70 be positioned between the air-impermeable sheet 72 and the mixture 74 of the reinforcing fibers and thermoplastic resin. The polymer sealant 64 extends circumferentially around the mixture of reinforcing fibers and thermoplastic resin 74 and seals the stainless steel sheet 68 to the aluminum foil 72. It is presently further preferred to position a first release cloth 76 between the mixture of reinforcing fibers and thermoplastic resin and the substrate surface and a second release cloth 78 between the mixture of reinforcing fibers and thermoplastic resin and the second stainless steel sheet 70. Preferred release cloths contain poly(tetrafluroethylene). The release cloth is more preferably textured on at least the surface that faces the mixture 74 to provide a flow path suitable for venting volatiles which may escape the mixture upon heating. A release cloth having a thickness in the range from about 0.25 to 0.40 mm is presently preferred. Highly suitable material is teflon coated glass cloth availlable from Caddilac Plastics.

It is further preferred in the invention to position breather cloths between the release cloths and the stainless steel sheets. Accordingly a first breather cloth 80 in preferred embodiment can be positioned between the first release cloth 76 and the stainless steel sheet 68 and a second breather cloth 82 can be positioned between the second release cloth 78 and the second stainless steel 70. The breather cloths 80 and 82 are preferably formed from five harness satin weave fiberglass cloth. Highly preferred breather cloths are sold under the designation Bleederlease "C" and are available from Airtech.

In practice, the invention has special utility when used to produce large composite sheets having a size, for example, in the range from about 10 square feet up to about 100 square feet. To practice the embodiment of the invention shown in FIG. 1, for example, the substrate sheet is laid out on a table and the vacuum bagging layup is formed. The tabletop is preferably approximately the same height as the upper surface of the support means 12. The layup is then slid from the table top (the table is preferably mounted on casters) and into the oven. The vacuum source and temperature elements are connected, a door 84 of the oven is closed and hot air from source 26 is introduced into the oven. The hot air is preferably distributed as a plurality of jets against the air-impermeable sheet and the substrate to provide uniform heat up of the mixture. To prevent the silicone sealant bead from hardening, cold air can be emitted from the source 44 through cold air jets situated around the perimeter of the oven and against the portion of the vacuum bagging layup adjacent to the sealant bead. See FIG. 5. The cold air can be at a temperature of less than 100° F., for example. The hot air is preferably at a temperature of more than 100° F. above the melting point of the thermoplastic resin. More preferably, the hot air is at a temperature in the range from about 200° F. to 500° F. above the melting point of the resin. An electrical heater has been used to provide hot air having such temperatures with good results. For poly(arylene sulfide) resins having a melting or softening points in the range from about 550° F. to 850° F., a hot gas temperature in the range of from about 850° to 1250° F. is highly suitable. Sufficient hot gas is introduced into the oven to provide a cycle time ranging from about 5 minutes to about 5 hours, usually in the range of from about 10 minutes to about 100 minutes. When the temperature sensor indicates that the thermoplastic resin is in molten form, the hot air source can be disconnected and the cold air source can be connected to jet cold air in on to the vacuum bagging layup to quickly cool it to a manageable temperature. The door 84 is then opened and the layup removed for recovery of the composite sheet.

In accordance with one aspect of the invention, the heatup and cooldown cycles are at least partially automated. With reference to FIG. 4, a housing 100 is divided by a partition 102 such as could be formed from curtain, into a heating chamber 104 and a cooling chamber 106. An endless belt 108, formed from a metal grate, for example, to withstand the temperatures involved, extends through the chambers 104 and 106 and is driven by an indexer 110 which can be actuated by a timer or temperature sensor, as desired. The heating chamber 104 is connected to a hot air source 112 and an exhaust stack 114. The cooling chamber 106 is connected to a cold air source 116 and an exhaust stack which can be the same as or different from the exhaust stack 114. The chambers 104 and 106 are preferably operated at about the same pressure as each other to reduce crossflow. Otherwise, the conditions of operation can be the same as in the oven hereinbefore described.

In operation of this embodiment, a vacuum bagging layup 118 is positioned on a stationary or slowly moving belt 108 to be drawn into the heating chamber 104. The vacuum bagging layup can be as hereinbefore or as hereinafter described. The layup is connected to a vacuum hose 120 which is connected to a vacuum source 122. The vacuum hose 120 can be drawn from the outlet end 124 of the oven 100 to the inlet and 126 of the oven by a trolley, not shown, for example. If desired, a temperature element can also be carried through the oven attached to the vacuum line. The composite layup 118 is drawn into the heating chamber 104 by the belt 108 and retained therein for a period of time sufficient to result in melting the thermoplastic resin and thoroughly impregnating the fiber reinforcement. During this time another vacuum bagging layup is prepared and positioned on the belt 108 at the upstream end 126 of the oven. The belt then carries the layup into heating chamber 104 past the curtain 102 and into the cooling chamber 106. Simultaneously therewith, the just-prepared vacuum bagging layup 118 is drawn into the heating chamber 104. The layup 118 then present in the cooling chamber 106 is cooled while the layup in the chamber 104 is heated to melt the resin and yet another layup 118 is prepared. Once the layup in the heating chamber 104 has been heated to the desired extent, the belt 108 is once again actuated by the indexer, causing a new layup 118 to be drawn in the heating chamber 104, the second heated layup to be drawn into the cooling chamber 106 and the first heated layup to be transported to the outlet 124 of the oven for removal and recovery of the composite.

The production of the vacuum bagging layup is the most labor intensive step of the process of the invention. Sealing the aluminum foil to the stainless steel caul plate is especially tedious. In accordance with the further embodiment of the invention, multiple layers of composites are laid up on the same stainless steel caul plate and covered with a common foil cover. The technique can be used to provide from 2 to 20 composites simultaneously.

Broadly speaking, this aspect of the invention can be practiced by forming a stack comprising a plurality of composite layers of thermoplastic resin and reinforcing fiber with metallic sheets positioned as the topmost and bottommost layers of the stack with at least two of the plurality of composite layers also separated by the metallic layers. The metallic layers can be stainless steel sheets as hereinbefore described. The resin and reinforcing fibers can also be as hereinbefore described. The stack is overlayed with a flexible, air-impermeable sheet which can be of aluminum foil as hereinbefore described and this air-impermeable sheet is sealed to the metallic sheet forming the bottommost layer of the stack such as with a polymer sealant as hereinabove described, thus forming a vacuum bagging layup. The vacuum bagging layup is heated to a temperature above the melting point of the thermoplastic resin to produce molten thermoplastic resin. This heating step can be practiced utilizing the convection oven as hereinbefore described. However, this embodiment of the invention can be used with other heating techniques as well and is not limited to a convection oven heat up although it is preferably used in conjunction with a convection oven heatup. Suction is applied between the overlaying flexible air-impermeable sheet and metallic sheet forming the bottommost layer of the stack to force the metallic sheet forming the topmost layer of the stack toward the metallic sheet forming the bottommost layer of the stack and causing impregnation of the reinforcing fibers with the molten thermoplastic resin. The layup is then cooled to solidify the molten thermoplastic resin and form a plurality of consolidated composite sheets of thermoplastic resin and reinforcing fibers. Preferably, each layer of the consolidated composite sheet is separated from the adjacent layers of composite on each side by metallic sheets in accordance with the practice of this embodiment of the invention. The techniques described hereinabove relating to preferred materials and techniques are equally applicable to this embodiment of this invention.

That which is claimed is:

1. A process for simultaneously forming a plurality of flattened consolidated composite sheets, each of said sheets comprising a fiber reinforced thermoplastic resin, said process comprising the steps of:
   (A) supporting on a substantially flat, rigid substrate surface a stack comprising a plurality of interfacially adjacently arranged composite layers,
      at least two adjacent said layers being separated from one another by an interposed metallic sheet,
      said stack further including a metallic sheet positioned adjacent the outside surface of each of the topmost said layer and the bottommost said layer,
      each said layer comprising a thermoplastic resin and reinforcing fibers,
      said substrate surface being thermally stable at a temperature above the melting point of said thermoplastic resin,
   (B) overlaying said stack with an air-impermeable sheet and sealing said air-impermeable sheet peripherally around said stack to said substrate surface,
      said air-impermeable sheet being thermally stable to a temperature above the melting point of said thermoplastic resin,
      thereby to produce a layup comprised of said substrate surface, said stack, and said air-impermeable sheet,
   (C) heating said layup in a heating zone to a temperature sufficient to melt said thermoplastic resin, said heating being carried out by impinging heated gas against said layup,
   (D) applying suction between said air-impermeable sheet and said substrate surface, thereby to urge said sheet towards said substrate surface and achieve wet-out of said reinforcing fibers by said molten thermoplastic resin, and
   (E) cooling said layup in a cooling zone to a temperature below the melting point of said thermoplastic resin, said cooling being carried out by impinging gas cooled to below about 100° F. against the resulting said layup, thereby to form said plurality of consolidated composite sheets.

2. A process of claim 1 further comprising after step (A) and before step (B) moving said layup into a convection oven zone, wherein said heating step is carried out.

3. A process of claim 2 wherein said stack comprises from 2 to about 20 said layers.

4. A process of claim 3 wherein said metallic sheets separating said layers are each comprised of stainless steel.

5. A process of claim 4 wherein said stainless steel sheets each have a thickness in the range of from about 0.2 to about 2 millimeters and are formed from a 400 series stainless steel.

6. A process of claim 4 wherein said air-impermeable sheet is comprised of aluminum foil.

7. A process of claim 6 wherein layers of release cloth separate each of said layers from each of said stainless steel sheets, and layers of breather cloth separate each of said layers of release cloth from each of said stainless steel sheets.

8. A process of claim 7 wherein said reinforcing fibers are selected from the group consisting of glass fibers, carbon fibers, and aramid fibers, and said reinforcing fibers are in fabric form; and wherein said thermoplastic resin comprises a poly(arylene sulfide) resin initially in a sheetlike form.

9. A process of claim 2 wherein said convection oven zone utilizes a plurality of heating gas jets, wherein the gas from said heating jets has a temperature between about 850° F. and 1250° F. and, for said cooling step, a plurality of cooling gas jets are employed wherein the gas from said cooling jets has a temperature below about 100° F., and said thermoplastic resin is poly(arylene sulfide).

10. A process of claim 1 wherein said consolidated composite sheets each have a thickness in the range of from about 0.25 to about 25 millimeters.

11. A process for forming a flattened consolidated composite sheet which comprises a fiber reinforced thermoplastic resin, said process comprising the steps of
   (A) supporting on a substantially flat, rigid substrate surface a layer of a mixture, said mixture comprising on a 100 weight percent basis from about 20 to about 80 weight percent of thermoplastic resin, and correspondingly from about 80 to about 20 weight percent of reinforcing fibers having an average length greater than about 1 centimeter and a length to diameter ratio greater than about 20, and said substrate surface being thermally stable at a temperature above the melting point of said thermoplastic resin,
   (B) overlaying said layer with an air-impermeable sheet and sealing said air-permeable sheet peripherally around said layer to said substrate surface, said air-impermeable sheet being thermally stable at a temperature above the melting point of said thermoplastic resin, thereby to produce a layup comprised of said substrate surface, said layer, and said air-impermeable sheet, (C) heating said layup in a heating zone to a temperature sufficient to melt said thermoplastic resin, said heating being carried out by impinging heated gas against said layup, (D) applying suction between said air-impermeable sheet and said substrate surface, thereby to urge said air-impermeable sheet towards said substrate surface and achieve wet-out of said reinforcing fibers with said molten thermoplastic resin, and (E) cooling said layup in a cooling zone to a temperature below the melting point of said thermoplastic resin, said cooling being carried out by impinging gas cooled to below about 100° F. against said layup, thereby to form said consolidated composite sheet, wherein said substrate surface is defined by an upper surface of a stainless steel sheet, a second stainless steel sheet is positioned between said air-impermeable sheet and said layer, said air-impermeable sheet is formed by aluminum foil, said stainless steel sheets are each formed from a 400 series stainless steel and have a thickness in the range of about 0.2 to about 2 millimeters, and said aluminum foil forming said air-impermeable sheet is so sealed to said stainless steel sheet forming said substrate surface with a polymeric sealant and wherein said process further comprises cooling said polymeric sealant with a flow of cool gas during said heating.

12. A process of claim 11 further comprising positioning a first release cloth between said layer and said substrate surface and positioning a second release cloth between said layer and said second stainless steel sheet, and wherein said first release cloth and said second release cloth are each textured on the surface thereof facing said layer, thereby to provide a gas flow path between said layer and said release cloths.

13. A process of claim 12 further comprising positioning a first breather cloth between said first release cloth and said substrate surface and positioning a second breather cloth between said second stainless steel sheet and said second release cloth.

14. A process of claim 13 wherein said release cloth has a thickness ranging from about 0.2 to 1 millimeter and contains poly(tetrafluroethylene).

15. A process of claim 11 wherein said layer comprises at least one sheet of a poly(arylene sulfide) resin and at least one sheet of a fiber reinforcement in the form of a fabric.

16. A process of claim 15 wherein said mixture comprises a prepreg of poly(arylene sulfide) containing said reinforcing fibers.

17. A process of claim 11 wherein said heating is conducted at a temperature between about 850° F. and 1250° F. and said thermoplastic resin comprises poly(arylene sulfide).

* * * * *